United States Patent [19]

Azmi et al.

[11] Patent Number: 4,474,027

[45] Date of Patent: Oct. 2, 1984

[54] OPTIMUM CONTROL OF COOLING TOWER WATER TEMPERATURE BY FUNCTION BLOCKS

[75] Inventors: Kaya Azmi, Akron; H. Moss William, Willoughby, both of Ohio

[73] Assignee: The Babcock & Wilcox Company, New Orleans, La.

[21] Appl. No.: 462,599

[22] Filed: Jan. 31, 1983

[51] Int. Cl.³ .......................... F28D 5/00; F25B 39/04
[52] U.S. Cl. ..................................... 62/171; 62/176.4; 62/183; 62/305; 261/26; 261/DIG. 11
[58] Field of Search .................. 62/171, 121, 305, 183, 62/125, 126, 127, 176.4; 261/26, 27, DIG. 11, 96, 97, 102, 105, 109, 110

[56] References Cited

U.S. PATENT DOCUMENTS 4,252,751 2/1981 Shito ............................ 261/DIG. 11
4,325,223 4/1982 Cantley ................................ 62/171

FOREIGN PATENT DOCUMENTS 0065884 5/1980 Japan .......................... 261/DIG. 11

Primary Examiner—Harry Tanner
Attorney, Agent, or Firm—Vytas R. Matas; Robert J. Edwards

[57] ABSTRACT

A system for optimizing the control of the water temperature within a cooling tower is disclosed. The temperature and the relative humidity of the air outside the cooling tower are measured and are selectively utilized as inputs to a plurality of modules containing function blocks in a logic arrangement. The function blocks produce an output signal indicative of the wet bulb temperature of the outside air which is compared to the cooling tower water temperature causing the speed of the cooling tower fans to be adjusted in response to the temperature difference therebetween.

6 Claims, 6 Drawing Figures

OPTIMUM CONTROL OF COOLING TOWER WATER TEMPERATURE BY FUNCTION BLOCKS

TECHNICAL FIELD

The present invention relates generally to a system for controlling the temperature of the water within a cooling tower, and more particularly to a system which optimizes control of the water temperature by means of function blocks.

BACKGROUND ART

Various methods have been utilized for controlling cooling tower water temperatures. For example, in some instances the water temperature is controlled so as to be substantially constant through the use of analog equipment. The inherent disadvantage of this approach is that system efficiency cannot be optimized since the water temperature remains substantially constant. Another approach is to vary the water temperature set point in response to changes in weather conditions. This approach typically requires a computer to calculate the set point temperature which, in turn, is utilized to modify the speed of the fans within the cooling tower. A still another approach is to optimize the overall cooling system by varying the cooling water temperature. The latter two approaches require the use of a computer which is costly to acquire and maintain due to the hardware and/or software required and the trained personnel required to operate same.

Because of the foregoing, it has become desirable to develop a system for optimizing the water temperature within a cooling tower without the use of a computer or analog equipment.

SUMMARY OF THE INVENTION

The present invention solves the aforementioned problems associated with the prior art as well as other problems by utilizing function blocks having fixed functional relations to provide the calculating features which are generally only available through the use of computers. Measurements of the temperature and relative humidity of the outside air are taken and processed through the use of the function blocks to determine the wet bulb temperature of the outside air. This wet bulb temperature is adjusted and used as a basis for comparison to the cooling tower water temperature, and the speed of the cooling tower fans is caused to increase or decrease depending on whether the cooling tower water temperature is too high or too low for optimum operation of the overall system.

DESCRIPTION OF THE PREFERRED EMBODIMENT

Figure 1:
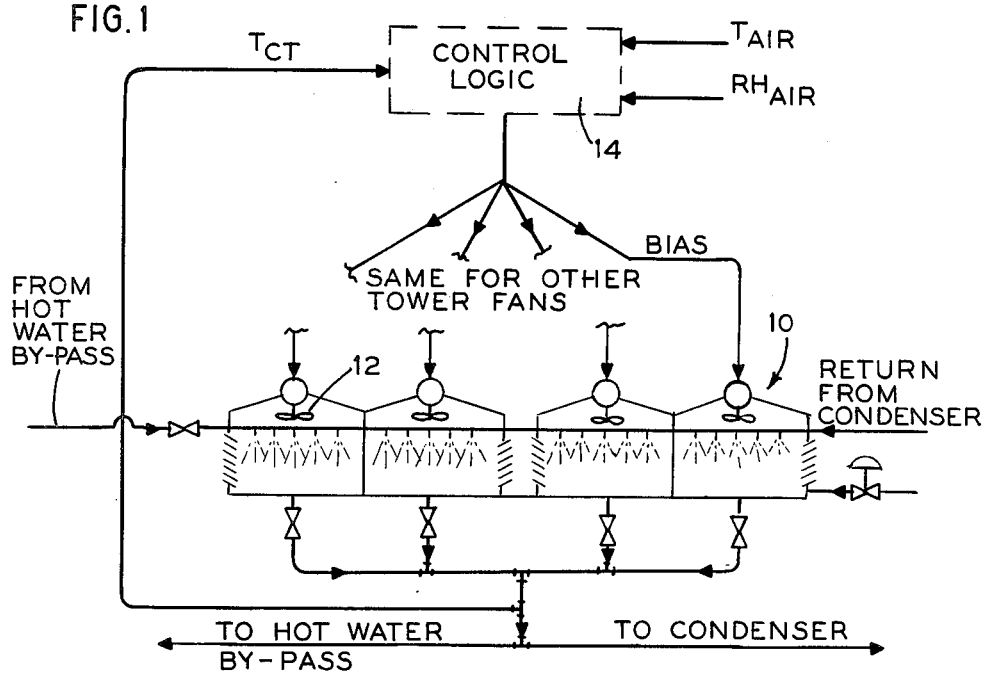
FIG. 1 is a schematic diagram of a cooling tower and the control logic module utilized by the invention of this disclosure.

Referring now to the drawings where the illustrations are for the purpose of describing the preferred embodiment of the present invention, and are not intended to limit the invention thereto, FIG. 1 is a schematic diagram of a cooling tower 10 illustrating the fans 12 utilized therein and the control logic module 14 employed to regulate and optimize the operation of the fans 12. The principle on which the system operates is that whenever the cooling tower temperature is more than 10° F. above the wet bulb temperature of the outside air, the tower temperature is reduced by increasing the level of fan operation. Thus, the control system lowers the cooling tower temperature whenever a lower cooling tower water temperature will result in a more than commensurate savings in compressor power consumption. In addition, the system conserves fan energy when the cooling tower temperature is sufficiently low enough.

Figure 2:
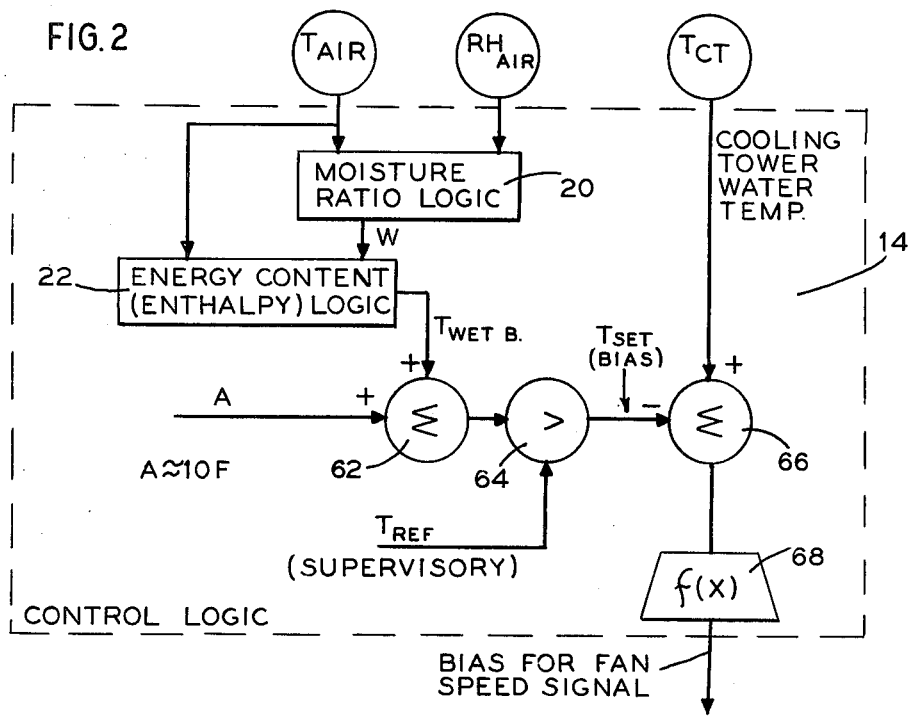
FIG. 2 is a schematic diagram of the moisture ratio logic module, the energy content (enthalpy) logic module and other function blocks which comprise the control logic module of the FIG. 1.

As shown in FIG. 1, measurements of the temperature and relative humidity of the outside air and the cooling tower water temperature are used as inputs to the control logic module 14. The subsystem logic modules comprising the control logic module 14 and the remaining function blocks comprising the module 14 are shown in FIG. 2. The foregoing subsystem logic modules include a moisture ratio logic module 20 and an energy content (enthalpy) logic module 22. These subsystem logic modules are arranged such that the measurement of the outside air temperature is used as an input to both of these logic modules 20 and 22, whereas the measurement of the relative humidity of the outside air is used as an input only to the moisture ratio logic module 20. The moisture ratio, w, which is the output of moisture ratio logic module is an input to the energy content (enthalpy) logic module 22.

Figure 3:
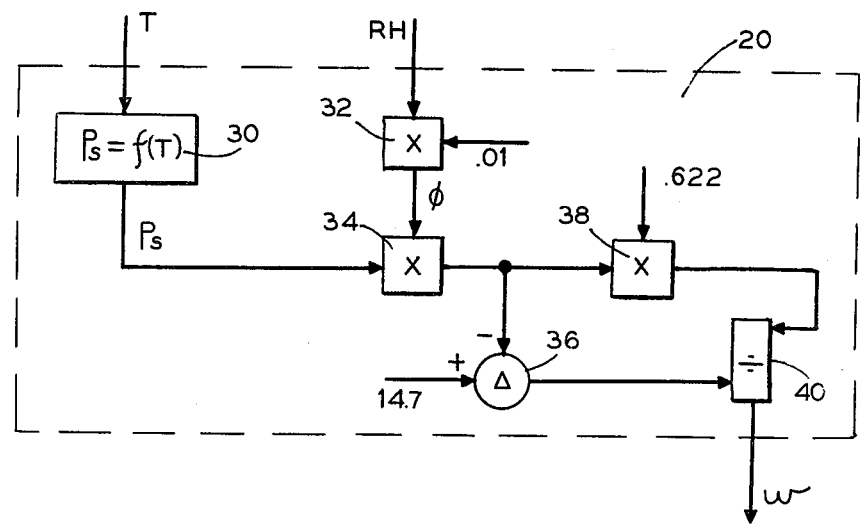
FIG. 3 is a schematic diagram of the function blocks which comprise the moisture ratio logic module of FIG. 2.
Figure 4:
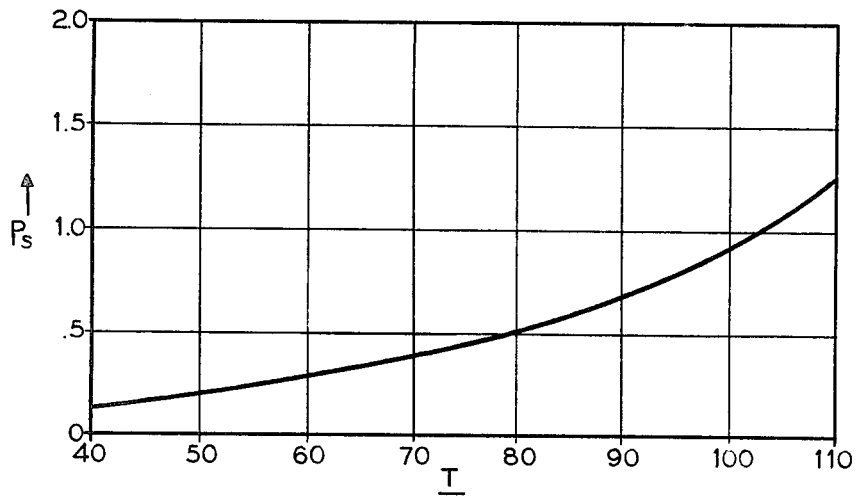
FIG. 4 is a graph illustrating the relationship between the evaporation pressure of water, $P_s$, with respect to the temperature of the outside air.

The function blocks comprising the moisture ratio logic module 20 are illustrated in FIG. 3. In this Figure, the measurement of the outside air temperature is used as an input to a function generator 30 which produces an output signal, $P_s$, in accordance with the graphical relationship shown in FIG. 4. This output signal, $P_s$, represents the evaporation pressure of water with respect to the temperature (T) of the outside air. The measurement of the relative humidity of the outside air is used as an input to a multiplication function block 32 wherein it is multiplied by the factor 0.01 to produce a signal $\phi = 0.01 RH$ at its output. This signal $\phi$ and the evaporation pressure of water, $P_s$, are used as inputs to a multiplication function block 34 which produces an output signal representative of the function $\phi \, P_s$ at its output. This output signal is applied to the negative input to a subtraction function block 36. The other input to this function block 36 is the factor 14.7 which is applied to the positive input thereto. The output of the function block 36 is a signal representative of the relationship $14.7 - \phi \, P_s$. The output signal, $\phi \, P_s$, produced by the multiplication function block 34 is also applied as an input signal to a multiplication function block 38 wherein it is multiplied by the factor 0.622 to produce a signal representative of the relationship $(0.622)\phi P_s$ at its output. This output signal, along with the output signal produced by the subtraction function block 36 are used an inputs to a division function block 40 which produces an output signal, w, according to the following equation:

$$w = \frac{(.622) \phi P_s}{14.7 - \phi P_s}$$

This output signal w is representative of the moisture ratio of the outside air, i.e., the pounds of moisture per pound of dry air.

Figure 5:
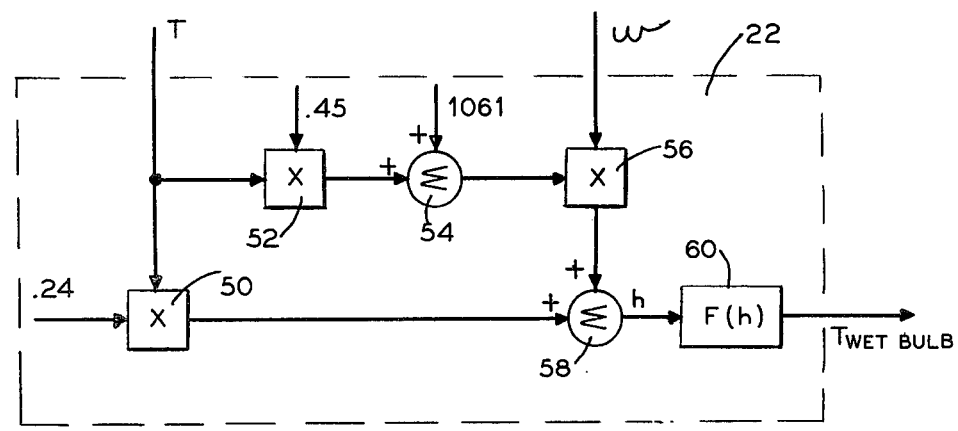
FIG. 5 is a schematic diagram of the function blocks which comprise the energy content (enthalpy) logic module of FIG. 2.

The function blocks comprising the energy content (enthalpy) logic module 22 are illustrated in FIG. 5. In this Figure, the measurement of the outside air temperature is used as a separate input to multiplication function blocks 50 and 52. In multiplication function block 50, this outside air temperature measurement is multiplied by the factor 0.24 to produce a signal equal to 0.24T as its output, whereas in multiplication function block 52 the outside air temperature measurement is multiplied by the factor 0.45 to produce a signal equal to 0.45T at its output. This latter output signal is applied as an input to an additional function block 54 whose other input is the factor 1061 so as to produce a signal representative of the summation 1061 +0.45T as its output. This signal representative of the summation 1061 +0.45T, along with the output signal w produced by the division function block 40 of FIG. 3, are used as inputs to a multiplication function block 56 which produces a signal representative of the function w (1061+0.45T) at its output. This latter signal, along with the output signal produced by multiplication function block 50, i.e., 0.24T, are applied as inputs to an addition function block 58 to produce an output signal, h, according to the following equation:

$$h = 0.24T + w(1061 + 0.45T)$$

Figure 6:
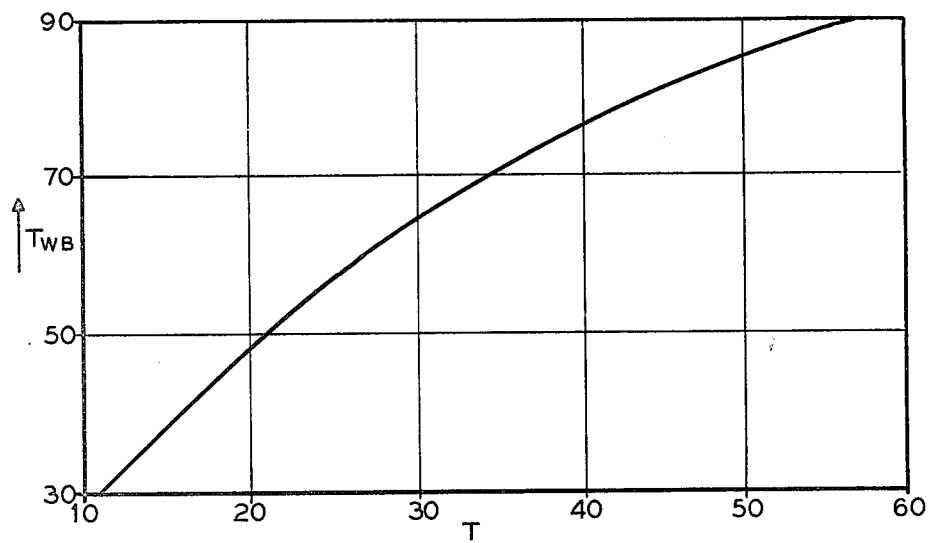
FIG. 6 is a graph illustrating the relationship between the wet bulb temperature of the outside air with respect to the energy content (enthalpy) of same.

This output signal h is representative of the energy content (enthalpy) of moist air per pound of dry air and is used as an input to a function generator 60 which produces an output signal $T_{wet\ bulb}$ in accordance with the graphical relationship shown in FIG. 6. This output signal, $T_{wet\ bulb}$, represents the wet bulb temperature of the moist outside air.

Referring again to FIG. 2, the foregoing signal representing the wet bulb temperature is applied as an input to an addition function block 62 whose other input is the factor $A \approx 10°$ F. so as to produce an output signal representative of the optimum set point for the system, i.e., 10° F. higher than the wet bulb temperature. This output signal is applied as an input is a comparison function block 64 whose other input is a supervisory reference temperature. The operation of comparison function block 64 is such that if the supervisory reference temperature is greater than the optimum set point as determined by the addition function block 62, the supervisory reference temperature is passed therethrough and appears at the output of the comparison function block 64, however, if this is not the case, the optimum set point as determined by the function block 62 appears at the output of the comparison function block 64. The output of the comparison function block 64 is applied to the negative input to an addition function block 66 along with the measurement of the cooling tower water temperature which is applied to the positive input thereto. The output of the function block 66 is applied to a function generator 68 which produces an output signal that acts as a bias or control signal for the fan speed. In this manner, if the cooling tower water temperature exceeds the wet bulb temperature of the air by more than 10° F. or if the cooling tower temperature exceeds the supervisory reference temperature, depending upon which input to function block 64 is controlling, the output signal produced by the function generator 68 will cause the speed of the fans 12 to increase. Coversely, if the cooling tower water temperature is less than 10° F. above the wet bulb temperature of the air or if this water temperature is less than the supervisory reference temperature, depending upon which input to function block 64 is controlling, the output signal produced by the function generator 68 will cause the speed of the fans 12 to decrease.

Certain modifications and improvements will occur to those skilled in the art upon reading the foregoing description. It will be understood that all such improvements and modifications have been deleted herein for the sake of conciseness and readability, but are properly within the scope of the following claims.

We claim:

1. A system for controlling the operation of a cooling tower comprising means for measuring one or more of the physical properties of the air surrounding the cooling tower, means for determining the wet bulb temperature of the air surrounding the cooling tower from the measurements of the physical properties produced by said measuring means, means for comparing said wet bulb temperature of the air surrounding the cooling tower with the temperature of the water within the cooling tower and producing an output signal in response to a difference therebetween, said output signal being utilized to control the temperature of the water within the cooling tower, means for adjusting said wet bulb temperature by a constant bias prior to being compared by said comparing means to the temperature of the water within the cooling tower, and means for establishing a preset supervisory reference temperature and means for comparing said adjusted wet bulb temperature with said preset supervisory reference temperature causing the larger of said wet bulb temperature and said preset reference temperature to be compared with the temperature of the water within the cooling tower.

2. The system as defined in claim 1 wherein said wet bulb temperature determining means includes means for determining the moisture content of the air surrounding the cooling tower.

3. The system as defined in claim 1 wherein said wet bulb temperature determining means includes means for determining the enthalpy of the air surrounding the cooling tower.

4. The system as defined in claim 2 wherein said moisture content determining means produces a signal indicative of the moisture content of the air surrounding the cooling tower, said signal being used as an input to a means for determining the enthalpy of the air surrounding the cooling tower.

5. The system as defined in claim 2 wherein said moisture content means is comprised of one or more function blocks arranged in a logic configuration.

6. The system as defined in claim 3 wherein said enthalpy determining means is comprised of one or more function blocks arranged in a logic configuration.

* * * * *